(12) United States Patent
Arai

(10) Patent No.: US 6,229,985 B1
(45) Date of Patent: *May 8, 2001

(54) COMMUNICATION APPARATUS

(75) Inventor: Shunji Arai, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/708,405

(22) Filed: Sep. 4, 1996

(30) Foreign Application Priority Data

Sep. 19, 1995  (JP) ................................... 7-263694

(51) Int. Cl.$^7$ ....................................... H04B 3/36
(52) U.S. Cl. ................. 455/8; 455/428; 455/524
(58) Field of Search .................... 455/8, 9, 524, 455/560, 445, 462, 465, 428

(56) References Cited

U.S. PATENT DOCUMENTS

| | | | |
|---|---|---|---|
| 5,210,785 | 5/1993 | Sato et al. ............................... | 379/58 |
| 5,258,853 | 11/1993 | Nobuta et al. ........................ | 358/444 |
| 5,392,136 | 2/1995 | Nobuta et al. ........................ | 358/444 |
| 5,392,449 * | 2/1995 | Shaughnessy et al. .................. | 455/8 |
| 5,436,962 | 7/1995 | Hirata ................................. | 379/212 |
| 5,437,059 * | 7/1995 | Murakami et al. .................. | 455/512 |
| 5,479,483 | 12/1995 | Furuya et al. . | |
| 5,548,799 * | 8/1996 | Kobayashi et al. ...................... | 455/8 |
| 5,559,860 * | 9/1996 | Mizikovsky ........................... | 379/58 |
| 5,570,343 * | 10/1996 | Bishop et al. ........................... | 455/8 |
| 5,711,002 * | 1/1998 | Foti ..................................... | 455/433 |
| 5,878,115 * | 3/1999 | Valentine et al. ..................... | 379/59 |

FOREIGN PATENT DOCUMENTS

| | | |
|---|---|---|
| 6-006300 | 6/1992 | (JP) . |
| 4-315326 | 11/1992 | (JP) . |
| 5-153036 | 6/1993 | (JP) . |
| 5-218951 | 8/1993 | (JP) . |
| 6-121052 | 4/1994 | (JP) . |
| 7-87565 | 3/1995 | (JP) . |
| 7-147696 | 6/1995 | (JP) . |

OTHER PUBLICATIONS

Japanese Office Action (dated Feb. 2, 1999).

* cited by examiner

*Primary Examiner*—Daniel S. Hunter
*Assistant Examiner*—Darnell R. Armstrong
(74) *Attorney, Agent, or Firm*—Morgan & Finnegan, LLP

(57) ABSTRACT

When a power failure occurs, a control unit 107 of a main apparatus 101 acquires the outside line 102*a* through an outside line I/F unit 102 and transmits a signal for requesting terminating transfer and a signal for designating a transfer destination to a public network 108 while receiving power from a backup power supply 106M. After this terminating transfer is requested, and an incoming call to the telephone number of an outside line 102*a* is received, the public network 108 calls the transfer destination designated for terminating transfer. If the telephone number for calling a radio telephone set 109 from a public base station 113 is designated as this transfer destination, the public base station 113 calls the radio telephone set 109 in a terminating transfer operation.

34 Claims, 4 Drawing Sheets

COMMUNICATION APPARATUS

BACKGROUND OF THE INVENTION

1. Field of the Invention

The present invention relates to a communication apparatus connected to a network having a transfer function.

2. Description of the Related Art

A conventional communication system is constituted by a main apparatus accommodating an outside line and an extension, and a radio communication unit (to be referred to as an extension radio communication unit hereinafter) connected to the extension. Assume that the supply of power from a commercial power supply to the main apparatus is stopped owing to a power failure or the like. In this case, if the main apparatus has a backup power supply, the main apparatus can operate as long as the backup power supply lasts.

In the above conventional communication system, however, the extension radio communication unit has no arrangement for detecting the stoppage of the main apparatus. For this reason, even if the supply of power from the backup power supply is stopped, and the operation of the main apparatus is stopped, the extension radio communication unit keeps operating in a private communication operation mode (to be referred to as a private communication mode). Consequently, the operator cannot communicate with a station outside the communication system through a public line by using the extension radio communication unit.

In addition, a station outside the communication system cannot detect that the main apparatus cannot be used. For this reason, the station cannot communicate with the communication system.

SUMMARY OF THE INVENTION

It is an object of the present invention to allow execution of communication by means of a service provided by a communication network even if an abnormality occurs in an apparatus.

It is another object of the present invention to respond to an incoming call by means of a service provided by a communication network even if an abnormality occurs in an apparatus.

It is still another object of the present invention to transfer an incoming call from a radio base station to a terminal when an abnormality occurs in an apparatus.

It is still another object of the present invention to cope with an abnormality in an apparatus by effectively using a public communication mode of a terminal.

It is still another object of the present invention to provide a novel countermeasure against a power failure.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

The first embodiment of the present invention will be described below with reference to FIGS. 1 and 2.

Figure 1:
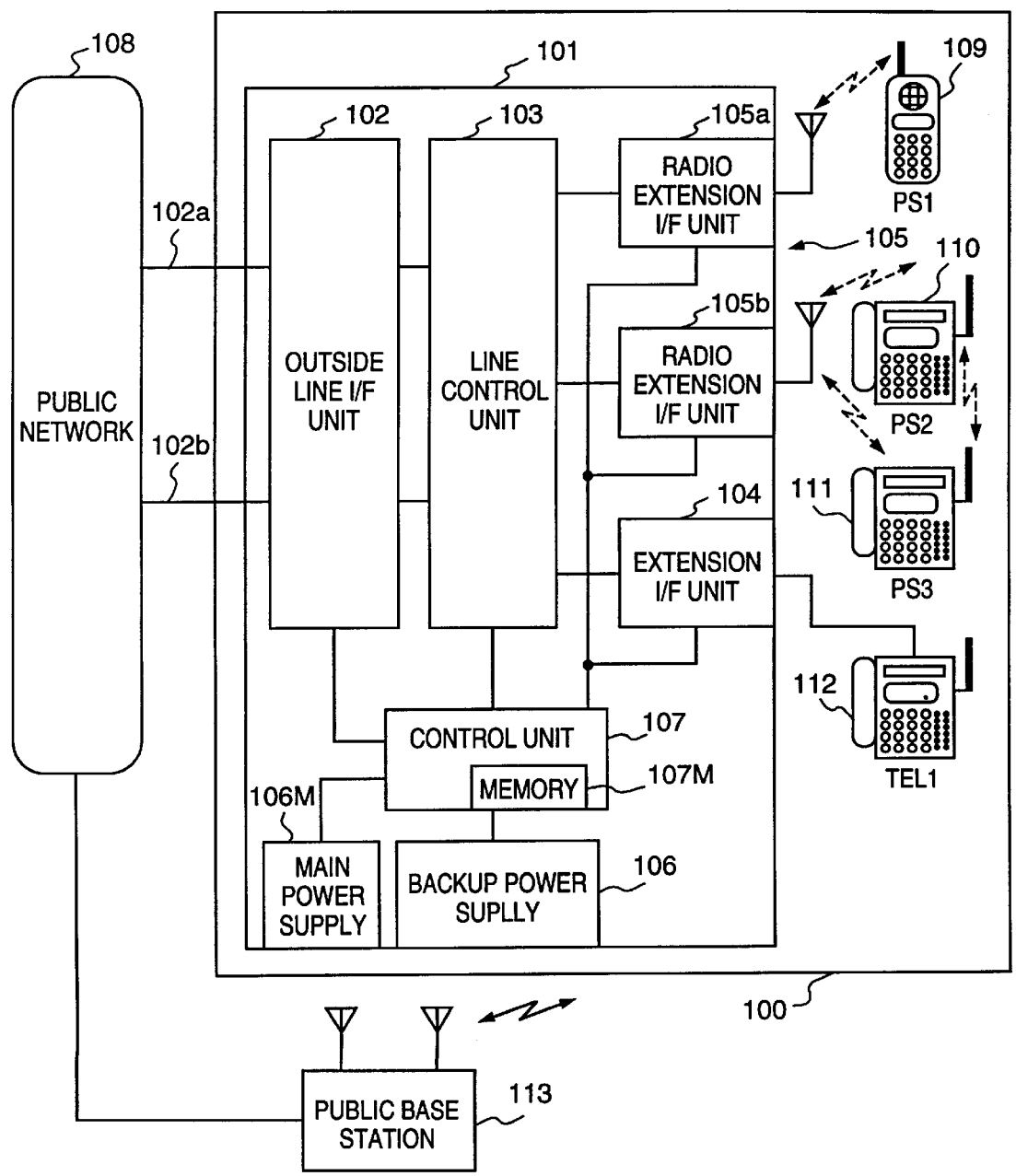
FIG. 1 is a block diagram showing the arrangement of a communication system according to the first embodiment of the present invention.

FIG. 1 is a block diagram showing the arrangement of a communication system of this embodiment. Referring to FIG. 1, a communication system 100 is constituted by a main apparatus 101, extension radio telephone sets 109, 110, and 111, and an extension telephone set 112.

The main apparatus 101 is connected to a public network 108 through an outside line interface (I/F) unit 102 accommodating a plurality of outside lines 102$a$ and 102$b$. In addition, the main apparatus 101 is radio-connected to the extension radio telephone sets 109, 110, and 111 through radio extension interface (I/F) units 105$a$ and 105$b$, and is wire-connected to the extension telephone set 112 through an extension interface (I/F) unit 104 accommodating at least one extension.

Note that the number of outside lines is not limited to two, and may be three or more or one. The number of extension radio telephone sets is not limited to three, and may be one. The extension telephone set 112 may be omitted.

A line control unit 103 for performing connection control between the outside lines 102$a$ and 102$b$ and a plurality of extensions is arranged between the outside line I/F unit 102, the extension I/F unit 104, and the radio extension I/F units 105$a$ and 105$b$. The respective constituent elements 102 to 105 are connected to a control unit 107 for controlling the overall main apparatus 101. The control unit 107 is connected to a main power supply 106M and a backup power supply, and normally receives power from a commercial power supply (not shown) through the main power supply 106M. When the control unit 107 cannot receive sufficient power from the commercial power supply owing to a power failure or the like, the control unit 107 receives power from a backup power supply 106 for enabling the overall operation of the main apparatus 101.

The public network 108 transfers a communication which is to be sent to the telephone number of the outside line 102$a$ or 102$b$ accommodated by the main apparatus 101 to the telephone numbers of the extension radio telephone sets 109, 110, and 111 in accordance with an instruction (to be described later) from the main apparatus 101. Note that the transfer destinations are stored in a memory 107M of the control unit 107. A public base station 113 is radio-connected to the extension radio telephone sets 109, 110, and 111. The public base station 113 starts operating in accordance with an instruction from the public network 108 to connect the communication transferred to the telephone numbers of the extension radio telephone sets 109, 110, and 111 thereto.

Figure 2:
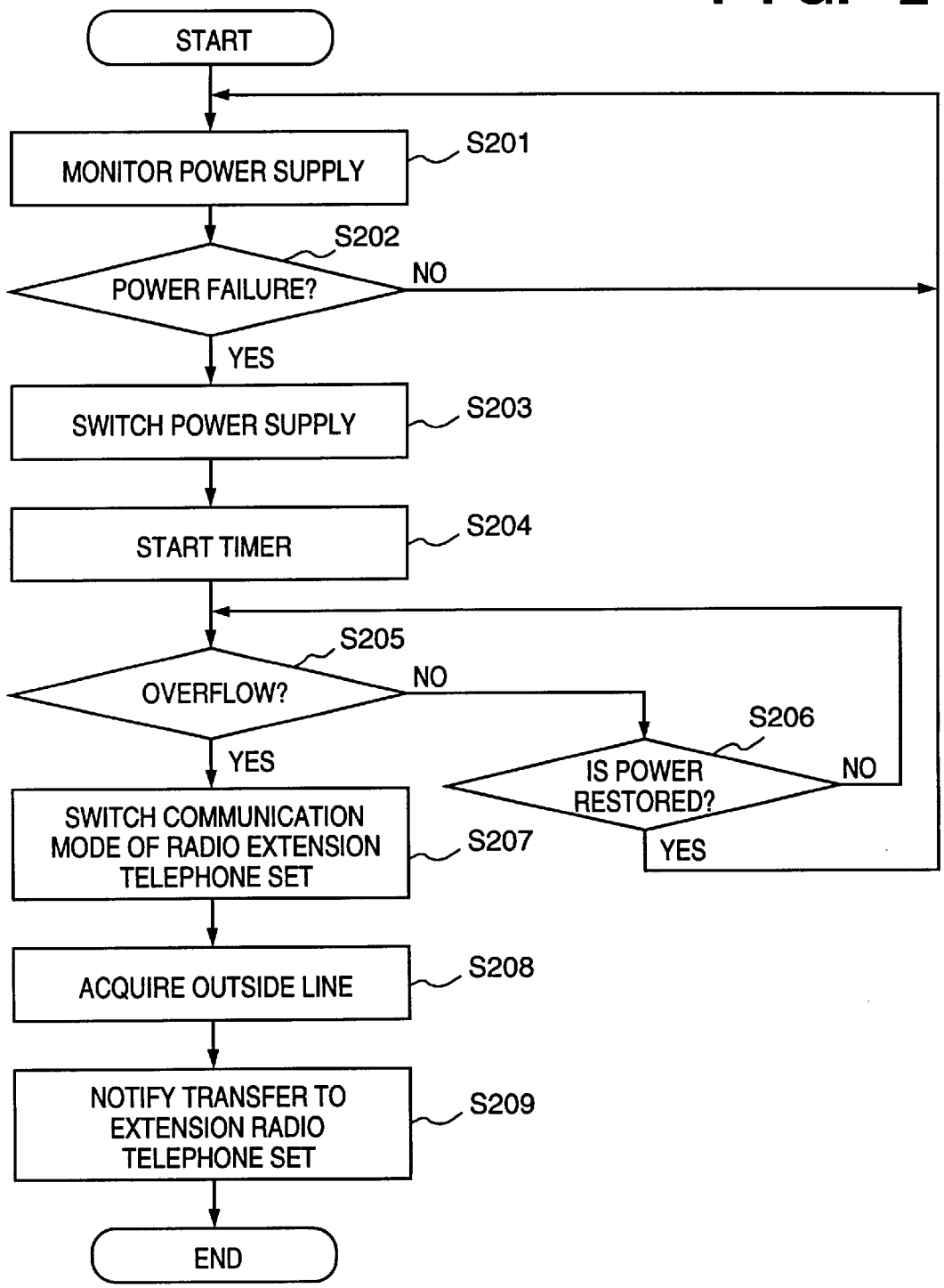
FIG. 2 is a flow chart for explaining an operation procedure of a main apparatus of the first embodiment of the present invention.

FIG. 2 is a flow chart for explaining the operation procedure of the main apparatus 101 of the communication system 100 having the above arrangement.

In a normal operation state, the supplied state of power to the main apparatus 101 is always monitored by the control unit 107 (step S201). It is checked on the basis of the monitoring result in step S201 whether the supply of power from the commercial power supply is stopped owing to a power failure or the like (step S202). If NO in step S202, i.e., it is determined that power is normally supplied, the flow returns to step S201, and the processing in steps S201 and S202 is repeated.

If YES in step S202, i.e., it is determined that the supply of power from the commercial power supply is stopped, the power supply line is switched to the backup power supply 106 (step S203), and a timer (not shown) in the control unit 107 is started (step S204).

It is then checked whether the time counted by the timer has exceeded a predetermined time set in accordance with the capacity of the backup power supply 106 (step S205). If NO in step S205, it is checked whether the supply of power from the commercial power supply is started upon restoration of power or the like (step S206). If YES in step S206, i.e., the supply of power from the commercial power supply is resumed before the lapse of the predetermined period of time, the flow directly returns to step S201 to monitor the supplied state of power. If NO in step S206, the flow returns to step S205. The processing in steps S205 and S206 is repeated until the supply of power from the commercial power supply is resumed, or the time counted by the timer exceeds the predetermined period of time.

If it is determined in step S205 that the time counted by the timer exceeds the predetermined period of time, the control unit 107 notifies the extension radio telephone sets 109, 110, and 111, through the radio extension I/F units 105a and 105b, of an instruction to switch from the private communication mode of performing communication through the main apparatus 101 as an extension telephone unit to the public communication mode of performing communication through the public base station 113 by directly using the public network 108 before the capacity of the backup power supply 106 decreases, and power required for the operation of the main apparatus 101 cannot be sufficiently supplied (step S207). In addition, the control unit 107 acquires the outside lines 102a and 102b through the outside line I/F unit 102 (step S208). The control unit 107 notifies the public network 108, through the outside line I/F unit 102, that when communications are sent to the telephone numbers of the outside lines 102a and 102b accommodated in the main apparatus 101, the communications are to be transferred to the telephone numbers of the extension radio telephone sets 109, 110, and 111 (step S209). In step S209, the control unit 107 acquires the outside line 102a, and sends a number for requesting terminating transfer and the telephone number of the extension radio telephone set 109 to the public network 108 through the outside line 102a. In addition, the control unit 107 acquires the outside line 102b, and sends a number for requesting terminating transfer and the telephone number of the extension radio telephone set 110 to the public network 108 through the outside line 102b. Upon reception of the notification in step S207, the extension radio telephone sets 109, 110, and 111 are switched to the public communication mode. In the public communication mode and the private communication mode, different channels are received in standby states.

As described above, according to this embodiment, when the supply of power from the commercial power supply to the main apparatus 101 is stopped, the extension radio telephone sets 109, 110, and 111 which have been used as extension telephone sets for private communication are used as radio telephone units for the public line to allow communication through the public base station 113 before the supply of power from the backup power supply 106 is stopped. Therefore, the users of the extension radio telephone sets 109, 110, and 111 can use the extension radio telephone sets 109, 110, and 111 without noticing that the main apparatus 101 cannot be used owing to a power failure or the like. Furthermore, even in performing communication to the telephone number of an outside line from a station outside the communication system, a failure to perform communication because of a failure to use the main apparatus 101 can be prevented. That is, when an incoming call to the telephone number of the outside line 102a is received, the public network 108 calls the extension telephone set 109 through the public base station 113. When an incoming call to the telephone number of the outside line 102b is received, the public network 108 calls the extension telephone set 110 through the public base station 113.

The second embodiment of the present invention will be described next with reference to FIGS. 1, 3, and 4.

In this embodiment, while power is supplied, a predetermined control signal is periodically transmitted from a radio extension I/F unit 105 of a main apparatus to extension radio telephone sets 109, 110, and 111. In addition, the transmission of the control signal is stopped before the capacity of a backup power supply 106 decreases, and power required for the operation of a main apparatus 101 cannot be sufficiently supplied. With this operation, when the predetermined control signal is not received by the extension radio telephone sets 109, 110, and 111, the extension radio telephone sets 109, 110, and 111 switch to the public communication mode by themselves. Note that the arrangement of this embodiment is common to that of the communication system of the first embodiment shown in FIG. 1.

Figure 3:
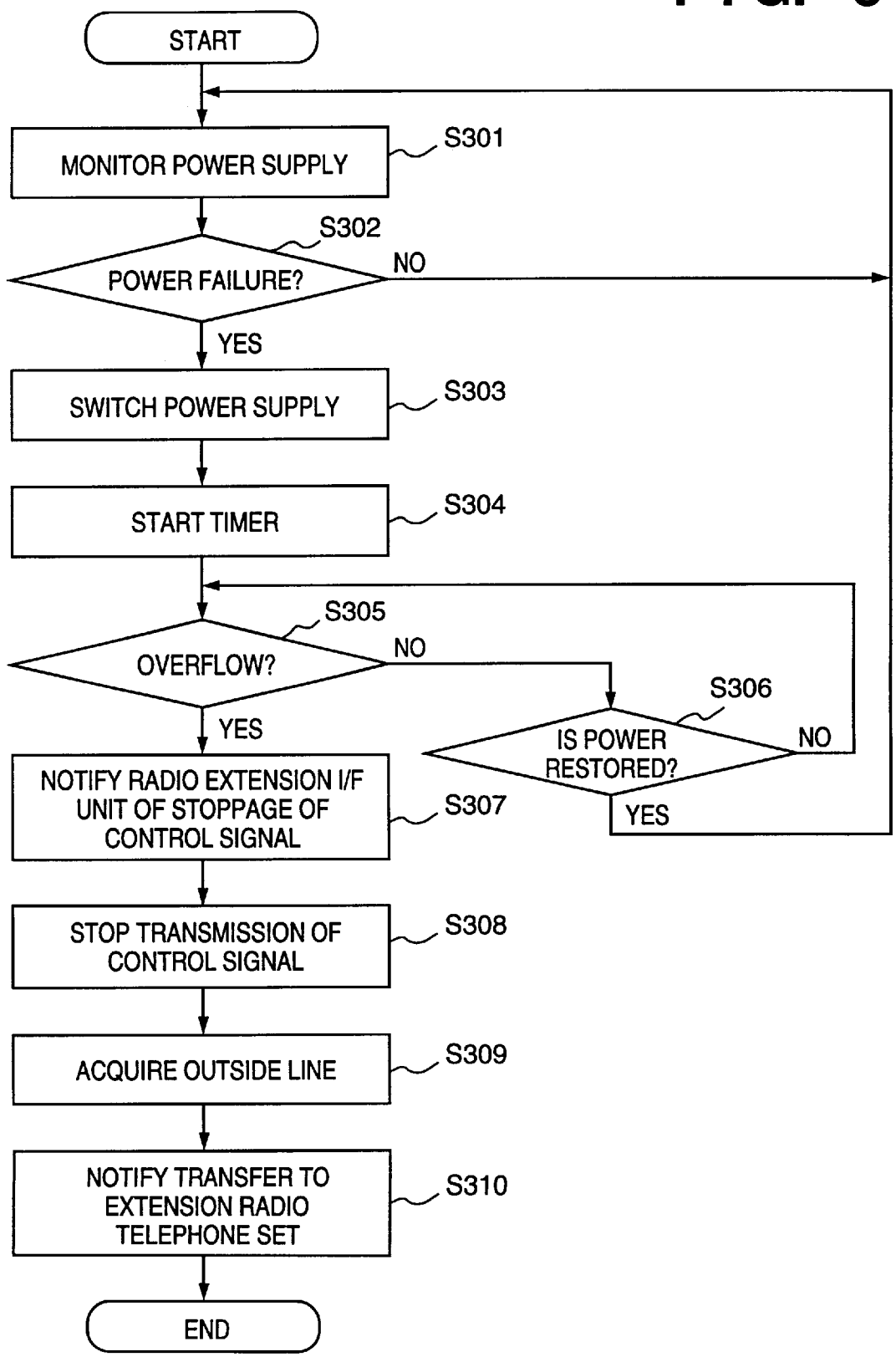
FIG. 3 is a flow chart showing the operation procedure of a main apparatus of the second embodiment of the present invention.

FIG. 3 is a flow chart for explaining the operation procedure of a control unit 107 in the main apparatus 101 in this embodiment.

In a normal operation state, the supplied state of power to the main apparatus 101 is always monitored by the control unit 107 (step S301). It is checked on the basis of the monitoring result in step S301 whether the supply of power from the commercial power supply is stopped owing to a power failure or the like (step S302). If NO in step S302, i.e., it is determined that power is normally supplied, the flow returns to step S301, and the processing in steps S301 and S302 is repeated.

If YES in step S302, i.e., it is determined that the supply of power from the commercial power supply is stopped, the power supply line is switched to the backup power supply 106 (step S303), and a timer (not shown) in the control unit 107 is started (step S304).

It is then checked whether the time counted by the timer has exceeded a predetermined time set in accordance with the capacity of the backup power supply 106 arranged in the main apparatus 101 (step S305). If NO in step S305, it is checked whether the supply of power from the commercial power supply is started upon restoration of power or the like (step S306). If YES in step S306, i.e., the supply of power from the commercial power supply is resumed before the lapse of the predetermined period of time, the flow directly returns to step S301 to monitor the supplied state of power. If NO in step S306, the flow returns to step S305. The processing in steps S305 and S306 is repeated until the supply of power from the commercial power supply is resumed, or the time counted by the timer exceeds the predetermined period of time.

If it is determined in step S305 that the time counted by the timer exceeds the predetermined period of time, the control unit 107 notifies the radio extension I/F unit 105 of the stoppage of the transmission of the predetermined control signal before the capacity of the backup power supply 106 decreases, and power required for the operation of the main apparatus 101 cannot be sufficiently supplied (step S307), thereby stopping the transmission of the predetermined control signal (step S308).

After the transmission of the predetermined control signal is stopped, the control unit 107 acquires outside lines 102a and 102b through an outside line I/F unit 102 (step S309). The control unit 107 notifies a public network 108, through the outside line I/F unit 102, that when communications are sent to the telephone numbers of the outside lines 102a and 102b accommodated in the main apparatus 101, the communications are to be transferred to the telephone numbers of the extension radio telephone sets 109, 110, and 111 (step S309).

Figure 5:
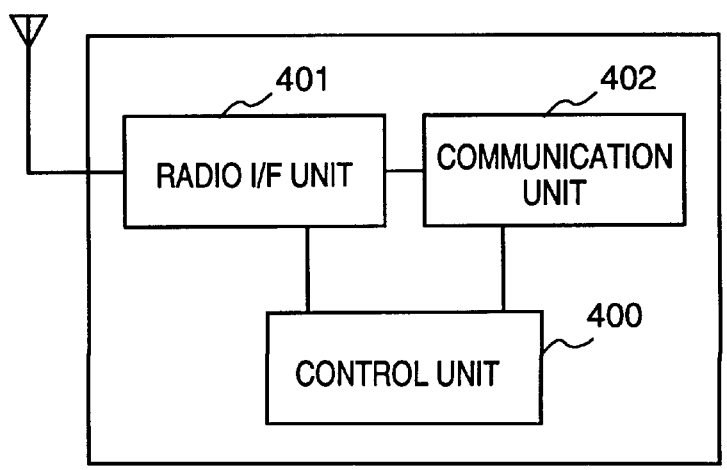
FIG. 5 is a block diagram showing the arrangement of an extension radio telephone set according to the second embodiment of the present invention.

FIG. 5 shows the arrangement of each of the extension radio telephone sets 109, 110, and 111. Reference numeral 400 denotes a control unit; 401, a radio I/F unit; and 402, a communication unit including a handset and the like.

Figure 4:
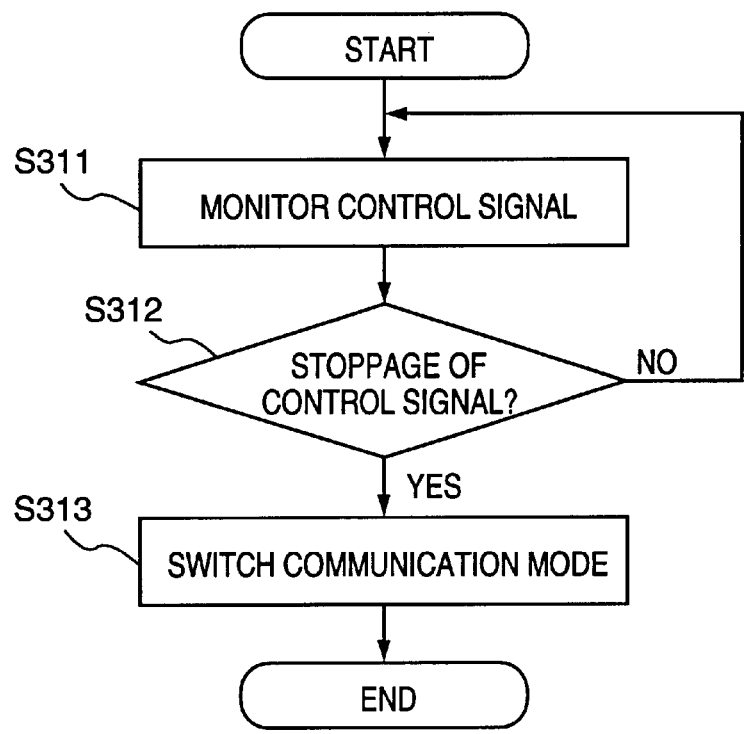
FIG. 4 is a flow chart showing the operation procedure of an extension radio telephone set of the second embodiment of the present invention.

FIG. 4 is a flow chart for explaining the operation procedure of each of the extension radio telephone sets 109, 110, and 111 in this embodiment.

In the control unit 400 of each of the extension radio telephone sets 109, 110, and 111, the predetermined control signal periodically transmitted from the main apparatus 101 is always monitored by the radio I/F unit 401 (step S311). When the predetermined control signal is not received, i.e., if YES in step S312, the communication mode of the radio I/F unit 401 is switched from the private communication mode to the public communication mode (step S313).

Note that each extension radio telephone set uses different control channels in the private communication mode and the public communication mode.

Switching from the private communication mode to the public communication mode may be performed according to the procedure disclosed in Japanese Patent Laid-Open No. 7-87565.

As described above, when a power failure occurs, the control unit 107 in the private network acquires the outside line 102a through the outside line I/F unit 102 and transmits a signal for requesting terminating transfer and a signal for designating a transfer destination to the public network 108 while receiving power from the backup power supply. When this terminating transfer is requested, and an incoming call to the telephone number of the outside line 102a is received, the public network 108 calls the transfer destination designated for terminating transfer. If the telephone number for calling the radio telephone set 109 from the public base station 113 is designated as this transfer destination, the public base station 113 calls the radio telephone set 109 in a terminating transfer operation.

When the control unit 107 switches the communication mode of the radio telephone set 109 from the private communication mode to the public communication mode, the radio telephone set 109 switches the current frequency to a frequency to be monitored in a standby state. If the radio telephone set can alternately monitor the control channel for private communication and the control channel for public communication in a standby state, the control unit 107 need not switch the communication mode of the radio telephone set 109. When the extension radio telephone sets 109, 110, and 111 are to be called from the radio extension I/F unit 105, or the radio extension I/F unit 105 is to be called from the extension radio telephone sets 109, 110, and 111, the control channel for private communication is used. When the extension radio telephone sets 109, 110, and 111 are to be called from the public base station 113, or the radio extension I/F unit 105 is to be called from the extension radio telephone sets 109, 110, and 111, the control channel for public communication is used.

When incoming calls are received from the outside lines 102a and 102b while power is supplied from a main power supply 106M, the control unit 107 calls the extension radio telephone sets 109, 110, and 111 through the radio extension I/F unit 105.

As the public network 108, a digital or analog network can be used as long as it has a terminating transfer function.

As many apparently widely different embodiments of the present invention can be made without departing from the spirit and scope thereof, it is to be understood that the invention is not limited to the specific embodiments thereof except as defined in the appended claims.

What is claimed is:

1. A communication apparatus comprising:
   connection means for connecting a communication network; and
   request means for requesting a transfer service of the communication network upon occurrence of a power failure,
   wherein a transfer request sent to the communication network includes a number of a transfer destination, such that an incoming call generated to a number of the communication apparatus after reception of the transfer request is connected to the number of the transfer destination by the communication network.

2. The apparatus according to claim 1, wherein said connection means connects the communication network to a communication terminal.

3. The apparatus according to claim 2, wherein said request means requests the transfer service so as to transfer an incoming call to the communication terminal.

4. The apparatus according to claim 2, wherein the communication network comprises a radio base station, and said request means requests the transfer service so as to cause the radio base station to transfer an incoming call to the communication terminal.

5. The apparatus according to claim 2, wherein said request means further requests the communication terminal to communicate in a public communication mode.

6. The apparatus according to claim 5, wherein said request means stops transmission of a control signal to the communication terminal so as to request the communication terminal to communicate in the public communication mode.

7. The apparatus according to claim 2, wherein the communication terminal performs radio communication.

8. The apparatus according to claim 1, wherein said request means requests the transfer service a predetermined period of time after the occurrence of the abnormality.

9. A method of controlling a communication apparatus connected to a communication network, comprising the steps of:
   detecting a power failure; and
   requesting a transfer service of the communication network upon detection of the power failure,
   wherein a transfer request sent to the communication network includes a number of a transfer destination, such that an incoming call generated to a number of the communication apparatus after reception of the transfer request is connected to the number of the transfer destination by the communication network.

10. A communication system comprising:
    a private base station;
    a public base station;
    a public network for connecting said private base station to said public base station; and
    a radio terminal,
    wherein said private base station requests said public network upon occurrence of a power failure, wherein a transfer request sent to said public network includes a number of said radio terminal, such that an incoming call generated to a number of said private base station after reception of the transfer request is connected to the number of said radio terminal by said public network through said public base station.

11. The system according to claim 10, wherein said radio terminal communicates with said public base station in a public communication mode.

12. The system according to claim 10, wherein said private base station requests said public network such that an incoming call to a number corresponding to said private base station is transferred to a number corresponding to said radio terminal through said public base station.

13. The system according to claim 10, wherein said private base station changes a mode of said radio terminal from a private communication mode in which said radio terminal performs radio communication via said private base station to a public communication mode in which said radio terminal performs radio communication via said public base station.

14. The apparatus according to claim 1, wherein said request means requests the transfer service of the communication network such that an incoming call to a number corresponding to the communication apparatus is transferred to a number corresponding to the transfer destination.

15. The apparatus according to claim 1, wherein said request means changes a mode of the transfer destination from a private communication mode to a public communication mode.

16. The method according to claim 9, wherein the transfer service of the communication network is requested in said requesting step such that an incoming call to a number corresponding to the communication apparatus is transferred to a number corresponding to the transfer destination.

17. The method according to claim 9, wherein a mode of the transferred destination is changed from a private communication mode to a public communication mode.

18. A connection apparatus comprising:
    connecting means for connecting a radio communication apparatus to a communication network; and
    request means for requesting a transfer request to the communication network in a case of a power failure,
    wherein the transfer request sent to the communication network includes a number of the radio communication apparatus, such that an incoming call generated to a number of the connection apparatus after reception of the transfer request is connected to the number of the radio communication apparatus by the communication network through a base station connected to the communication network.

19. The apparatus according to claim 18, wherein said request means requests the communication network such that an incoming call to a number corresponding to the connection apparatus is transferred to a number corresponding to the radio communication apparatus.

20. The apparatus according to claim 18, wherein said request means changes a mode of the radio communication apparatus from a local mode in which the radio communication performs radio communication via said connecting means to a network mode in which the radio communication apparatus performs radio communication via the base station.

21. A method of controlling a connection apparatus for connecting a radio communication apparatus to a communication network, comprising the steps of:
    detecting a power failure; and
    requesting a transfer request to the communication network in a case of the power failure,
    wherein the transfer request sent to the communication network includes a number of the radio communication apparatus, such that an incoming call generated to a number of the connection apparatus after reception of the transfer request is connected to the number of the radio communication apparatus by the communication network through a base station connected to the communication network.

22. The method according to claim 21, wherein the communication network is requested in said requesting step such that an incoming call to a number corresponding to the connection apparatus is transferred to a number corresponding to the radio communication apparatus.

23. The method according to claim 21, wherein a mode of the radio communication apparatus is changed from a local mode in which the radio communication apparatus performs radio communication via the connection apparatus to a network mode in which the radio communication apparatus performs radio communication via the base station.

24. A connection apparatus comprising:
    connecting means for connecting a radio communication apparatus connected via a radio line to a communication network;
    detecting means for detecting an abnormality; and
    changing means for changing, in accordance with detection of said detecting means, a mode of the radio communication apparatus used for a call that will generate after a mode change made by said changing means, from a local mode in which the radio communication apparatus performs radio communication via said connecting means to a network mode in which the radio communication apparatus performs radio communication via a base station connected to the communication network.

25. The apparatus according to claim 24, wherein said changing means changes the mode by informing the radio communication apparatus of an instruction for changing the mode.

26. The apparatus according to claim 24, wherein said changing means changes the mode by stopping control signals for setting the mode of the radio communication apparatus in the local mode.

27. A method for controlling a connection apparatus for connecting a radio communication apparatus connected via a radio line to a communication network, comprising the steps of:
    detecting an abnormality; and
    changing, in accordance with detection in said detecting step, a mode of the radio communication apparatus from a local mode in which the radio communication apparatus performs radio communication via the connection apparatus to a network mode in which the radio communication apparatus performs radio communication via a base station connected to the communication network.

28. The method according to claim 27, wherein the mode is changed in said changing step by informing the radio communication apparatus of an instruction for changing the mode.

29. The method according to claim 27, wherein the mode is changed in said changing step by stopping control signals for setting the mode of the radio communication apparatus in the local mode.

30. A communication apparatus comprising:

connection means for connecting a communication network to a communication terminal; and request means for requesting a transfer service of the communication network upon occurrence of an abnormality, wherein a transfer request sent to the communication network includes a number of a transfer destination, such that an incoming call generated to a number of the communication apparatus after reception of the transfer request is connected to the number of the transfer destination by the communication network; and wherein said request means further requests the communication terminal to communicate in a public communication mode.

31. A method of controlling a communication apparatus connected to a communication network, comprising the steps of:

detecting an abnormality;

requesting a transfer service of the communication network upon detection of the abnormality, wherein a transfer request sent to the communication network includes a number of a transfer destination, such that an incoming call generated to a number of the communication apparatus after reception of the transfer request is connected to the number of the transfer destination by the communication network; and requesting the transfer destination to communicate in a public communication mode.

32. A communication system comprising:

a private base station;

a public base station;

a public network for connecting said private base station to said public base station; and a radio terminal, wherein said private base station requests said public network upon occurrence of an abnormality, the request including a number of said radio terminal, such that an incoming call generated to a number of said private base station after reception of the transfer request is connected to the number of said radio terminal by said public network through said public base station; and requests said radio terminal to communicate in a public communication mode.

33. A connection apparatus comprising:

connecting means for connecting a radio communication apparatus to a communication network; and request means for requesting a transfer request to the communication network in a case of an abnormality;

wherein the transfer request sent to the communication network includes a number of the radio communication apparatus, such that an incoming call generated to a number of the connection apparatus after reception of the transfer request is connected to the number of the radio communication apparatus by the communication network through a base station connected to the communication network;

wherein said request means further requests the radio communication apparatus to communicate in a public communication mode.

34. A method of controlling a connection apparatus for connecting a radio communication apparatus to a communication network, comprising the steps of:

detecting an abnormality; and transmitting a transfer request to the communication network, upon the occurrence of the abnormality, including a number of the radio communication apparatus, such that an incoming call generated to a number of the connection apparatus after reception of the transfer request is connected to the number of the radio communication apparatus by the communication network through a base station connected to the communication network; and transmitting, upon the occurrence of the abnormality, a request to the radio communication apparatus so as to communicate in a public communication mode.

* * * * *

UNITED STATES PATENT AND TRADEMARK OFFICE
CERTIFICATE OF CORRECTION

PATENT NO.   : 6,229,985 B1
DATED        : May 8, 2001
INVENTOR(S)  : Shunji Arai It is certified that error appears in the above-identified patent and that said Letters Patent is hereby corrected as shown below:

<u>Title page,</u>
<u>Item [56], U.S. PATENT DOCUMENTS,</u>
please delete the line beginning with "5,559,860.";
please delete the line beginning with "5,711,002.";
please delete the line beginning with "5,878,115.";

<u>Item [56], FOREIGN PATENT DOCUMENTS,</u>
please insert a reference to Japanese Patent Application 61-293033 (6/20/85).

Signed and Sealed this

Eighteenth Day of December, 2001

*Attest:*

*Attesting Officer*

JAMES E. ROGAN
*Director of the United States Patent and Trademark Office*